J. P. FARMER.
GAS PURIFIER.
APPLICATION FILED APR. 25, 1910.

999,973.

Patented Aug. 8, 1911.

Witnesses

John P. Farmer,
Inventor by C. A. Snow & Co.
Attorneys

UNITED STATES PATENT OFFICE.

JOHN P. FARMER, OF PORTLAND, OREGON, ASSIGNOR OF ONE-FOURTH TO PAUL J. G. KLEPPIN AND ONE-FOURTH TO JOSEPH WICK, BOTH OF PORTLAND, OREGON.

GAS-PURIFIER.

999,973.  Specification of Letters Patent.  Patented Aug. 8, 1911.

Application filed April 25, 1910. Serial No. 557,460.

*To all whom it may concern:*

Be it known that I, JOHN P. FARMER, a citizen of the United States, residing at Portland, in the county of Multnomah and State of Oregon, have invented a new and useful Gas-Purifier, of which the following is a specification.

It is the object of this invention to provide a gas purifier, so constructed that the maximum efficiency may be secured from a purifying agent which is within the device.

Figure 1:
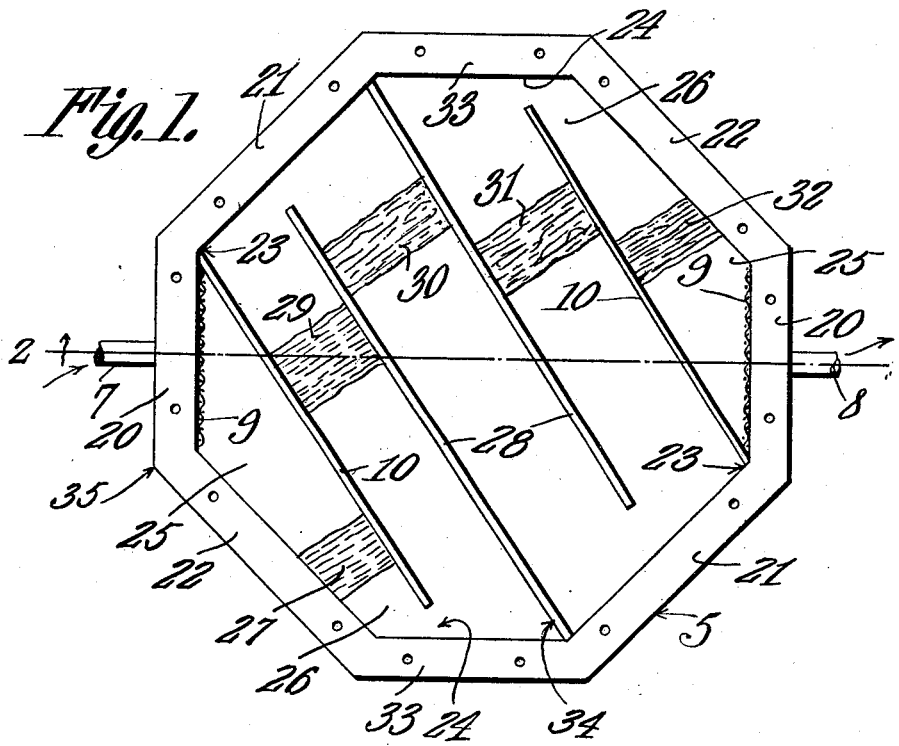
Figure 2:
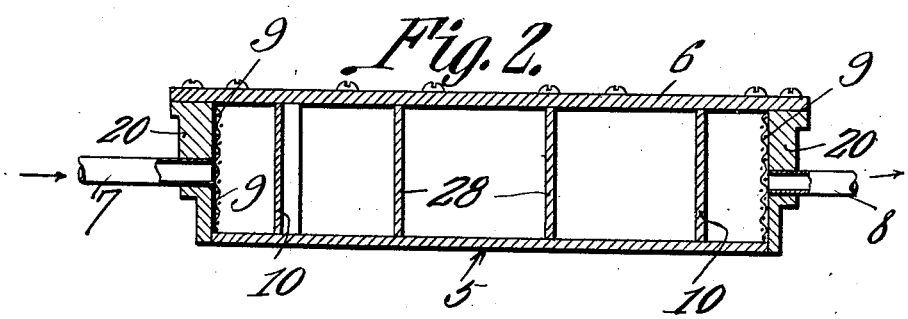

In the drawings, Figure 1 is a plan of the purifier, the cover, and portions of the purifying agents being removed; and, Fig. 2 is a transverse section on the line 2—2 of Fig. 1, the purifying agents being omitted.

The invention includes a box-like, polygonal casing 5, preferably octagonal in outline. The casing rests either upon its bottom or upon one of the sides of the polygon, and when the latter expedient is resorted to, the angles defined by the gas inlet 7 and the gas outlet 8 with respect to the horizontal, may be varied through a wide range. The casing 5 is closed by a cover 6, and screens 9 are placed over the inner ends of the inlet 7 and the outlet 8. Partitions 10 are located within the casing 5, these partitions being secured at one end in the angle 23 defined by the sides 20 and 21 of the casing, the inlet 7 and the outlet 8 being disposed in the walls 20. The angles 35 formed by the sides 20 and 22 of the casing, are opposite the partitions 10, and by this construction, a relatively large expansion chamber 25 is formed adjacent the inlet 7 and the outlet 8. The ends of the partitions 10 are spaced from the sides 33 of the polygon, and at the ends of the sides 33, inwardly projecting partitions 28 are disposed. The sides 22 of the polygonal casing are disposed at acute angles to the partitions 10, and thus, diminished throats 26 are formed adjacent the spaced ends 24 of the partitions 10.

The interior of the casing is divided by the partitions 10 and 28 into a plurality of compartments. In the first of these compartments, that is, the compartment which is adjacent the inlet 7, wool fiber 27 is placed, in the next compartment charcoal and iron or sawdust and iron may be disposed, as shown at 29. The next compartment will contain lime as at 30. The next compartment will contain charcoal, as at 31, and the last compartment, that is the compartment which is adjacent the outlet 8, will contain wool fiber, as at 32 or some equivalent substance. The several compartments will be filled ordinarily, with these purifying agents, but in the drawings, the purifying agents are but partly shown, in order not to obscure other details of the structure.

The purifying agent which is lodged in the angle 34 defined by one of the partitions 28 and the side 33 is ordinarily of but little consequence, for the reason that the gas does not penetrate into this angle 34. By reason, however, of the fact that the partition 10 is disposed at an acute angle to side 22 of the polygon, the diminished throat 26 is formed, and the gas, passing at increased velocity through this throat 26 will impinge against the side 33 of the polygon, this side 33 acting as a deflector to force gas into the angle 34, whereby the entire area of the filling 29 will be made efficient as a purifying agent.

By reason of the fact that the angle 35 is opposite to the partition 10, the expansion chamber 25 is formed. The gas, entering the inlet 7 will expand in this chamber 25 and pass through a relatively large amount of the filling 27, as soon as the gas enters the casing. By this construction, a large proportion of the impurities in the gas will be removed at once.

It is to be noted that the casing is symmetrical, and the advantages incident to the construction described, will be obtained if the pipe 8 is used as an inlet, instead of an outlet.

Having thus described the invention what is claimed is:—

A gas purifier comprising a polygonal casing provided in its interior with spaced partitions extended in opposite directions, each partition being united with the casing in one of the interior angles of the casing and being extended into close relation to the intermediate portion of an opposite wall of the casing, whereby each of said walls will constitute a deflector to direct the gas into the angle formed by said wall and the next partition; there being a filtering material lodged between the partitions and in said angles; alined inlet and outlet pipes extended through opposite walls of the casing; each wall of the casing constituting a flat base upon which the casing may be successively supported, to permit the pipes to assume different angles with respect to the horizontal, and to alter the angles between the partitions and the horizontal, thus to increase and diminish the efficiency of the partitions as retarding elements for the passing gas.

In testimony that I claim the foregoing as my own, I have hereto affixed my signature in the presence of two witnesses.

JOHN P. FARMER.

Witnesses:
E. F. ALLSHAW,
E. F. LERAN.

Copies of this patent may be obtained for five cents each, by addressing the "Commissioner of Patents, Washington, D. C."